Feb. 21, 1956    J. P. FOSNESS    2,735,634
EXTENSIBLE STRUT
Filed Oct. 27, 1952    2 Sheets-Sheet 1

INVENTOR.
JOHN P. FOSNESS
BY
William R. Lane
ATTORNEY

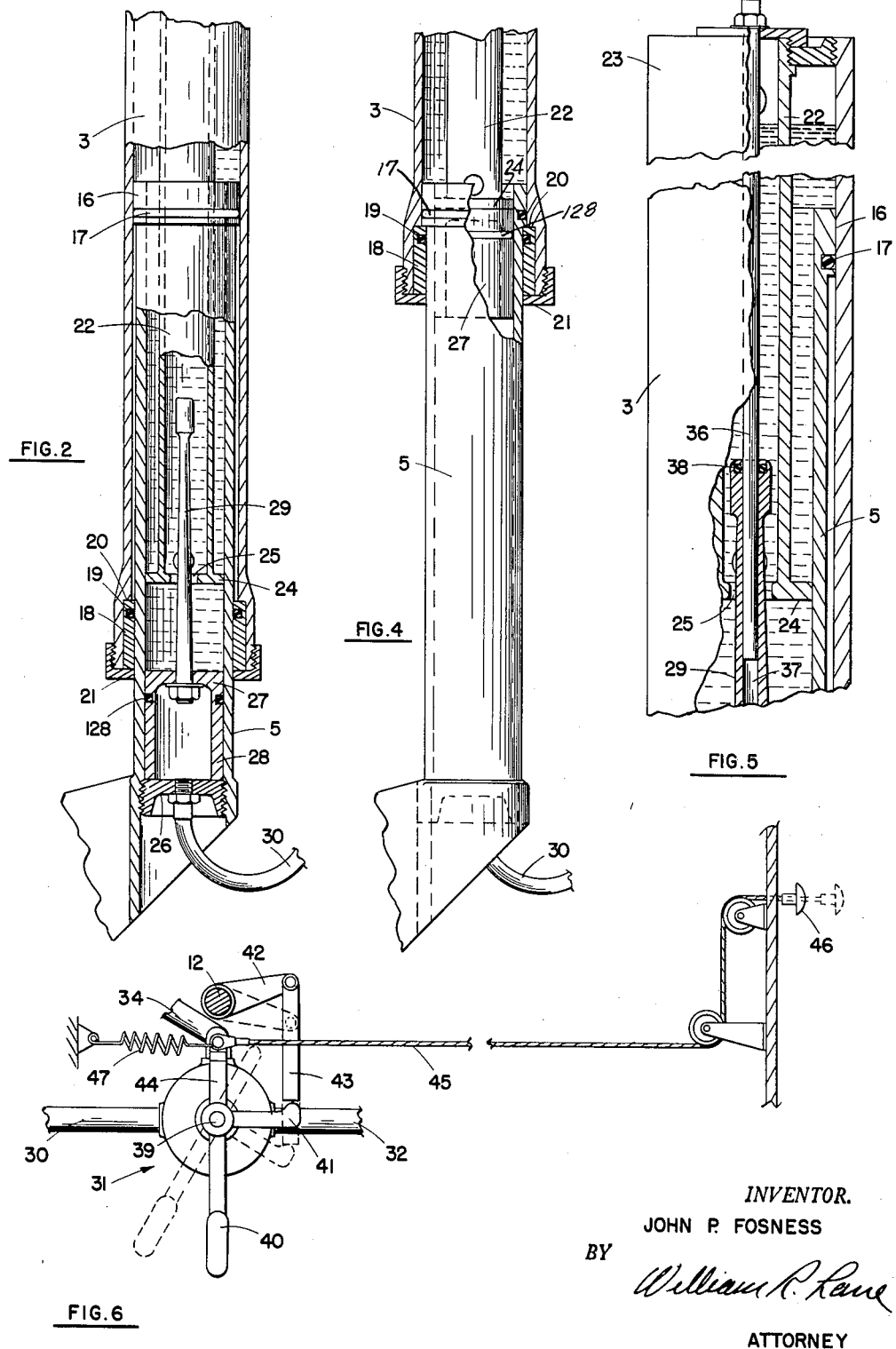

2,735,634

EXTENSIBLE STRUT

John P. Fosness, Pacific Palisades, Calif., assignor to North American Aviation, Inc.

Application October 27, 1952, Serial No. 317,089

7 Claims. (Cl. 244—104)

This invention pertains to an extensible strut and more particularly to an extensible shock absorbing strut for use with an aircraft landing gear.

It may be desirable in certain instances to change an airplane's angle of attack for take-off from that presented when the aircraft is normally resting on its landing gear. This is particularly so when the aircraft is to be launched by a catapult or where runway length must be short. It is of course necessary to have shock absorbing means associated with the landing gear for assuming the shock loads encountered during landing the aircraft. However, during take-off it is not necessary to have a complete shock absorbing system in the landing gear because the loads are different and much less from those encountered during a landing operation. Thus a landing gear strut for varying the angle of attack of an aircraft must have full shock absorbing ability on landing yet need not possess such characteristics when extended for take-off.

It is an object of this invention to provide a strut that may be extended.

Another object of this invention is to provide a strut that is extensible and that incorporates therewith a shock absorbing means.

An additional object of this invention is to provide a strut that may be extended during take-off and returned by the weight of the aircraft upon landing.

Still another object of this invention is to provide a strut that will provide a high angle of attack for take-off yet will provide normal shock absorbing characteristics for landing.

A further object of this invention is to provide a strut extensible by pressurized fluid and having means automatically operable for releasing the pressure upon raising the strut.

Figure 3:
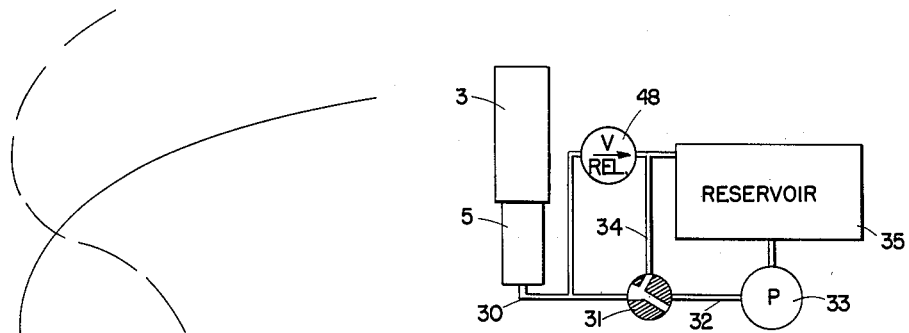
Figure 1:
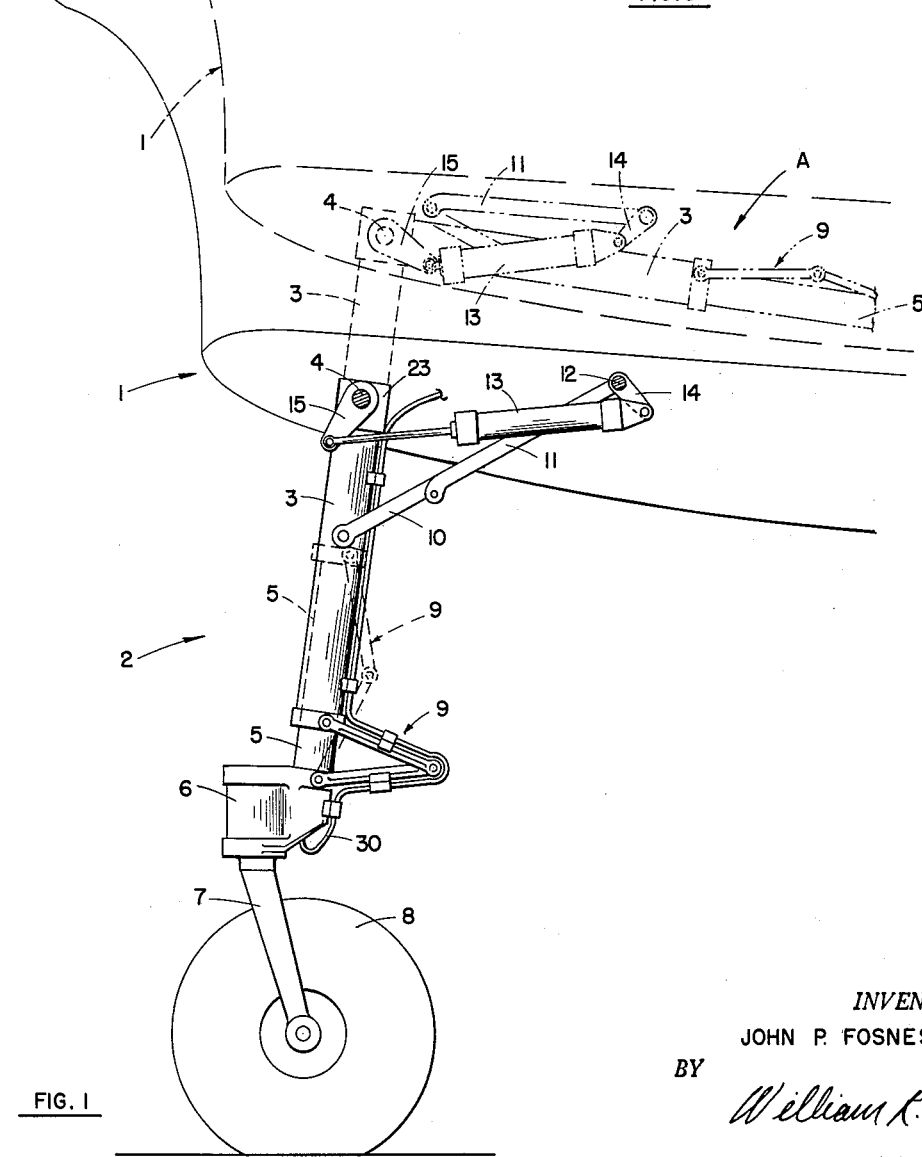

These and other objects of this invention will become apparent from the following detailed description taken in connection with the accompanying drawings in which:

Fig. 1 is an elevational view of the strut of this invention associated with an aircraft, Fig. 2 is a sectional view of the strut in normal position, Fig. 3 is a schematic view of the arrangement for introducing a pressurized fluid into the strut, Fig. 4 is a sectional view of the strut in extended position, Fig. 5 is a sectional view of a modification of the strut, and Fig. 6 is a schematic view of the control arrangement for the pressurized fluid.

Aircraft 1, as illustrated in Fig. 1, may be a carrier based airplane or any airplane for which it is desirable to change the attitude of the ship while it is resting on its landing gear. This aircraft may be equipped with a retractable tricycle landing gear which includes a front wheel unit 2. By the teachings of this invention front wheel strut 2 can be extended to raise the nose of the airplane so that the airplane assumes the position illustrated in phantom thereby increasing the angle of attack for take-off.

As shown in Fig. 2 front wheel unit 2 includes an outer cylinder 3 which is pivoted to and carried by the aircraft structure 1 by means of shaft 4. An inner cylinder 5 is reciprocable within the outer cylinder and extends downwardly below the outer cylinder when the landing gear is down. The inner cylinder may have a usual shimmy damp unit 6 associated therewith and may carry yoke 7 to which is attached wheel 8. The yoke and thus the wheel are pivotally carried so that the aircraft may be steered. Torque links 9 may be provided between the outer cylinder and the inner cylinder unit. All of these functions are conventional and well known in the art.

The retracting mechanism for the landing gear may be of any desired conventional type. For example, as illustrated in Fig. 1, drag brace 10 is pivotally connected to outer cylinder 3 and also to drag brace 11. The latter drag brace is mounted on shaft 12 which is suitably journaled in the aircraft structure. Actuator 13 is also connected with shaft 12 by means of arm 14. The opposite end of the actuator is connected with shaft 4 by means of arm 15. When the landing gear is down the actuator is in its extended position. To raise the landing gear the actuator is retracted which pivots shafts 4 and 12 counterclockwise and clockwise, respectively, from the position in solid lines in Fig. 1 thereby pivoting the outer cylinder and thus the entire wheel carrying assembly to the up position. The front wheel unit in a raised position is shown in broken lines indicated generally at A in Fig. 1.

As best seen in Fig. 2 the shock absorber portion of the strut is shown for purposes of illustration as the variable orifice type using a metering pin, but it could as well be a fixed orifice type of shock absorber or other suitable unit as desired.

At the upper end of inner cylinder 5 is a bearing portion 16 which engages the inner surface of outer cylinder 3. Included with the bearing portion is O-ring 17 which provides a seal between the inner and outer cylinders. Near the lower portion of the outer cylinder is bearing member 18 which engages the outer surface of inner cylinder 5. Thus the two bearings enable the inner cylinder to freely reciprocate within the outer cylinder. Bearing 18 is provided with O-ring 19 as a suitable sealing means. Bearing 18 is held in position by means of shoulder 20 of the outer cylinder and member 21 which may be threadably received or otherwise suitably fastened to the outer cylinder.

Plunger tube 22 is fixed to the closed upper end 23 of the outer cylinder and projects downwardly into the inner cylinder. The lower end of tube 22 is provided with an end 24 which is closely associated with the interior of inner cylinder 5. The central portion of end 24 is provided with an orifice 25.

At the bottom portion of inner cylinder 5 below tube 22 is a cylinder head 26 which serves to close off the bottom of the inner cylinder. Reciprocable within the lower portion of the inner cylinder above head 26 is a free-floating piston 27 which is provided with a skirt 28. Secured to and carried by piston 27 is tapered metering pin 29 which extends upwardly through orifice 25. The piston is provided with an O-ring 128 or other suitable sealing means so that all communication is prevented between the space below the piston and that above.

When the aircraft is normally resting on its landing gear, piston 27 is disposed at the bottom of the lower cylinder as illustrated. Above piston 27 is a quantity of shock absorbing fluid such as oil, and above the level of the oil is an air space near the top of the cylinder units. The oil and air maintain the cylinders at approximately the position shown in Fig. 2 when the aircraft is resting on the landing gear. A shock load will exert an additional force tending to urge the inner cylinder into the outer cylinder. As the cylinders are thus telescoped the air within the cylinders acts as a cushion, becoming compressed as the cylinders are forced closer together. As the air is compressed when the cylinders telescope the shock absorbing fluid will be forced through orifice 25 which provides a resistance to the oil flow and thus a shock absorbing action. As the inner cylinder moves upwardly relative to the outer cylinder, metering pin 29 moves farther into tube 22 thus varying the size of orifice 25 and varying the shock absorbing action.

To enable extension of the strut, pressure line 30 is connected to cylinder head 26 of the inner cylinder. As shown schematically in Fig. 3, line 30 connects with a valve 31 which may be manually or power operated. Line 32 connects the valve to pump 33 or other source of pressurized fluid and line 34 interconnects valve 32 and reservoir 35. When it is desired to extend the strut, valve 31 is turned so as to allow pressurized fluid to flow from the pump into inner cylinder 5 below piston 27. This pressurized fluid will first force the piston upwardly to engagement with end 24 of plunger tube 22 which acts as a stop for the piston. After this the fluid forces the outer cylinder upwardly relative to the inner cylinder thereby lengthening the strut and raising the nose of the aircraft. This extension will take place until bearing portion 16 of the inner cylinder engages bearing member 18 which acts as stop means and precludes further travel of the outer cylinder. The strut in its extended position is illustrated in Fig. 4. In this manner the inner cylinder is simply and quickly extended without the use of complicated machinery or weighty auxiliary parts. There is no shock absorbing action when the strut is extended, but for catapult take-off no such action is needed.

When it is desired to return the cylinders to their normal positions valve 31 is turned to the position of Fig. 3 which allows the pressurized fluid to return through line 34 to reservoir 35. The weight of the aircraft will return the cylinders to the normal position of Fig. 2 without the necessity of providing other means to retract the inner cylinder.

Fig. 5 illustrates a modification of this invention which may be used when it is impossible or undesirable to bring pressure line 30 into the bottom of the inner cylinder. By the provisions of this modification the pressurized fluid enters the inner cylinder through the metering pin. Thus line 30 connects at the top of cylinder 5 with tube 36 which is secured to end 23 of cylinder 3 and extends downwardly into the cylinder. Metering pin 29 is provided with a hollow bore 37 to receive the end of tube 36 which is freely reciprocable therein. O-ring 38 is associated with the bore of the metering pin to provide a seal between tube 36 and the metering pin. The operation of the unit is exactly the same as in the previously described modification with valve 31 admitting pressurized fluid through line 30, tube 36 and down through the bore of the metering pin to the space below piston 27. The metering pin and tube 36 must be so dimensioned that when piston 27 is at the bottom of inner cylinder 5 tube 36 will not be withdrawn from the metering pin.

In the preferred embodiment there are three possible provisions for the operation of valve 31 which may best be seen in Fig. 6. Mounted on the single actuating shaft 39 of the valve is an arm 40, which is adapted for manual operation by the ground crew of the airplane. In the position shown in solid lines the valve is positioned so as to direct pressurized fluid into cylinder 5. When arm 40 is pivoted to the position illustrated in phantom, the fluid is ported through line 34 to the reservoir. This same arm includes a second projecting portion 41 which is automatically operated by the landing gear mechanism when the landing gear is raised. Thus an arm 42 is carried or otherwise secured to shaft 12, and pivotally carries striker member 43. When the actuator is retracted and the landing gear is raised, shaft 12 is rotated and arm 43 will be forced downwardly into engagement with projecting arm 41, thus turning the valve and porting the pressurized fluid to the reservoir.

The third means of operating the valve enables the pilot to manually change the position of the valve, releasing the pressurized fluid. This is accomplished by means of an arm 44 which is also carried or otherwise attached to actuating shaft 39 of the valve. Cable 45 is attached to arm 44 and, through a suitable arrangement, connects with operating handle 46 which may be in the pilot's compartment of the aircraft. Spring 47 at the opposite end of cable 45 tends to hold the cable in the position illustrated in solid lines. The pilot may actuate the valve by pulling handle 46, thus moving arm 44 and directing the fluid into line 30. The valve must be rotated by arm 40 when it is desired to again direct pressurized fluid into the inner cylinder. When this is done spring 47 will return the handle to its original position.

As a safety feature, pressure relief valve 48 may be provided in line 30 as shown schematically in Fig. 3. If there should be a failure of the other means for releasing the pressurized fluid from the inner cylinder, valve 48 will provide an automatic release for this fluid when the landing gear unit is subjected to a shock load upon landing of the aircraft.

It can be seen from the foregoing description that I have provided a simple method of extending a strut particularly adaptable for aircraft which are to be launched by a catapult. The unit is lightweight, compact and serves as a normal shock absorber when not extended.

The foregoing detailed description is to be clearly understood as by way of illustration only, the spirit and scope of this invention being limited only by the appended claims.

I claim:

1. In an aircraft having a wheel, an extensible shock absorbing strut comprising an outer cylinder secured to and carried by said aircraft; an inner cylinder reciprocable within said outer cylinder, the lower portions of said inner cylinder being adapted to engage wheel supporting means, said inner cylinder including a fixed head portion over the lower end thereof; a freely floating piston reciprocable in the lower portion of said inner cylinder; stop means fixed relative to said outer cylinder and disposed in said inner cylinder above said piston and engageable thereby; shock absorbing means in said cylinders; and means for introducing pressurized fluid beneath said piston whereby said piston is forced upwardly against said stop means and said outer cylinder is subsequently forced upwardly relative to said inner cylinder.

2. A device as recited in claim 1 in which said shock absorbing means includes a tapered metering pin carried by said piston, said metering pin having an axial opening therethrough; and a tube slidably associated with said metering pin and extending beyond said cylinders for admitting said pressurized fluid through said tube and said metering pin into said inner cylinder.

3. In combination with an aircraft having a wheel, an extensible shock absorber comprising a first cylinder connected with said aircraft; a second cylinder reciprocable relative to said first cylinder; means associated with said second cylinder for supporting said wheel; a freely floating piston in said second cylinder; shock absorbing means in said cylinders above said piston; a stop in said second cylinder fixed relative to said first cylinder and disposed above said piston; and means for admitting pressurized fluid into said second cylinder beneath said piston for thereby shifting said first cylinder upwardly relative to said second cylinder.

4. An extensible load carrying member for an airplane having a wheel, said device comprising an outer cylinder adapted for attachment to such an airplane; an inner cylinder reciprocable in said outer cylinder, said inner cylinder being provided with means associated with the lower portions thereof for supporting a wheel of said airplane; a freely floating piston in said inner cylinder; shock absorbing means in said cylinders; stop means fixed relative to said outer cylinder and disposed in said cylinders above said piston; and means for admitting pressurized fluid into said inner cylinder beneath said piston whereby said piston is forced against said stop means and said outer cylinder is subsequently shifted upwardly relative to said inner cylinder.

5. A device as recited in claim 4 and including, in addition, means for moving said cylinders to a raised position, and means for automatically releasing said pressurized fluid from said inner cylinder when said cylinders are in said raised position.

6. An extensible strut for a vehicle, said strut comprising an outer cylinder adapted to be carried by such a vehicle, said cylinder having a closed upper end and an open lower end; an inner cylinder reciprocable in the lower portion of said outer cylinder; shock absorbing means in said cylinders; a floating piston reciprocable in the lower portion of said inner cylinder; stop means fixed relative to said outer cylinder and disposed in said inner cylinder above said piston and engageable thereby; and means for introducing pressurized fluid into said inner cylinder beneath said piston whereby said piston is forced upwardly into engagement with said stop means and said outer cylinder is forced upwardly relative to said inner cylinder.

7. An extensible load carrying strut for use with a vehicle, said strut comprising outer cylinder means carried by said vehicle and axially fixed relative thereto; inner cylinder means reciprocable in said outer cylinder means and extending beyond the lower portions thereof, said inner cylinder means having a closed bottom end; a piston reciprocable in said inner cylinder means; stop means fixed relative to said outer cylinder means and disposed in said inner cylinder means above said piston and engageable thereby; means for admitting pressurized fluid into said inner cylinder means below said piston whereby said piston is forced upwardly into engagement with said stop means and said outer cylinder means is forced upwardly relative to said inner cylinder means for thereby extending said strut; and stop means associated with said outer cylinder means for limiting the upward movement of said outer cylinder means.

References Cited in the file of this patent

UNITED STATES PATENTS

| 2,294,918 | Levy | Sept. 8, 1942 |
| 2,366,697 | Bound | Jan. 9, 1945 |
| 2,390,661 | Parilla | Dec. 11, 1945 |
| 2,563,194 | Shawbrook | Aug. 7, 1951 |
| 2,564,790 | Orloff et al. | Aug. 21, 1951 |
| 2,698,751 | Nye et al. | Jan. 4, 1955 |

FOREIGN PATENTS

| 505,263 | Great Britain | May 4, 1939 |
| 518,130 | Great Britain | Feb. 19, 1940 |
| 625,062 | Great Britain | June 21, 1949 |